US012763523B2

(12) United States Patent
Sun et al.

(10) Patent No.: US 12,763,523 B2
(45) Date of Patent: Oct. 13, 2026

(54) ELECTRICAL CONNECTOR ASSEMBLY WITH IMPROVED LIQUID COOLING PLATE

(71) Applicant: LUXSHARE THERMAL TECHNOLOGIES (HUIZHOU) CO., LTD, Huizhou City (CN)

(72) Inventors: Tao Sun, Huizhou City (CN); Jun Zhao, Huizhou City (CN); Jianhua Chen, Huizhou City (CN); Jiarong Li, Huizhou City (CN)

(73) Assignee: LUXSHARE THERMAL TECHNOLOGIES (HUIZHOU) CO., LTD, Huizhou City (CN)

( * ) Notice: Subject to any disclaimer, the term of this patent is extended or adjusted under 35 U.S.C. 154(b) by 280 days.

(21) Appl. No.: 18/426,888

(22) Filed: Jan. 30, 2024

(65) Prior Publication Data

US 2024/0413586 A1 Dec. 12, 2024

(30) Foreign Application Priority Data

Jun. 12, 2023 (CN) ........................ 202310693538.4

(51) Int. Cl.
*H01R 13/6581* (2011.01)
*H01R 12/71* (2011.01)

(52) U.S. Cl.
CPC ....... *H01R 13/6581* (2013.01); *H01R 12/716* (2013.01)

(58) Field of Classification Search
CPC ......................... H01R 13/6581; H01R 12/716; H01R 13/502; H01R 13/02; H01R 13/40; H05K 7/20254; H05K 7/20272; Y02T 10/70
See application file for complete search history.

(56) References Cited

U.S. PATENT DOCUMENTS

| | | | | |
|---|---|---|---|---|
| 10,856,446 | B2 * | 12/2020 | Boyden | G06F 1/183 |
| 11,414,202 | B2 * | 8/2022 | Tomescu | B64D 33/00 |
| 11,653,474 | B2 * | 5/2023 | Lu | H05K 7/20254 439/485 |

(Continued)

FOREIGN PATENT DOCUMENTS

| | | | |
|---|---|---|---|
| CN | 101094582 | A | 12/2007 |
| CN | 105406147 | A | 3/2016 |

(Continued)

*Primary Examiner* — Truc T Nguyen
(74) *Attorney, Agent, or Firm* — Birch, Stewart, Kolasch & Birch, LLP

(57) ABSTRACT

An electrical connector assembly includes an electrical connector and a liquid cooling plate. The electrical connector includes a metal shielding cage. The liquid cooling plate includes a cooling liquid inlet and a cooling liquid outlet. The liquid cooling plate includes a liquid cooling base plate and a cover plate fixed on the liquid cooling base plate. The liquid cooling base plate includes a first inlet flow channel, a second inlet flow channel and an outlet flow channel. The first inlet flow channel and the second inlet flow channel are arranged in parallel, and communicate with the cooling liquid inlet. The first inlet flow channel and the second inlet flow channel converge into the outlet flow channel. The outlet flow channel communicates with the cooling liquid outlet. As a result, the heat dissipation performance of the electrical connector assembly is improved.

18 Claims, 20 Drawing Sheets

(56) References Cited

U.S. PATENT DOCUMENTS

| | | | | |
|---|---|---|---|---|
| 12,610,500 | B2 * | 4/2026 | Lu ...................... | H05K 7/20254 |
| 2013/0164970 | A1 * | 6/2013 | Regnier ............... | H01R 13/533 |
| | | | | 165/185 |
| 2016/0197424 | A1 * | 7/2016 | L'Esperance ........ | G02B 6/4268 |
| | | | | 439/61 |
| 2020/0077541 | A1 * | 3/2020 | Sharf ................... | G02B 6/4268 |
| 2021/0153385 | A1 * | 5/2021 | Lu ...................... | H05K 7/20254 |
| 2022/0115268 | A1 | 4/2022 | Hollis | |
| 2026/0040485 | A1 * | 2/2026 | Liu .................... | H05K 7/20254 |
| 2026/0122845 | A1 * | 4/2026 | Tsai ................... | H05K 7/20272 |
| 2026/0136495 | A1 * | 5/2026 | Zhao .................. | H05K 7/20272 |

FOREIGN PATENT DOCUMENTS

| | | | |
|---|---|---|---|
| CN | 111564728 | A | 8/2020 |
| CN | 21241212 | U | 1/2021 |
| CN | 112928522 | A | 6/2021 |
| CN | 113131266 | A | 7/2021 |
| CN | 115513728 | A | 12/2022 |
| CN | 217983884 | U | 12/2022 |
| CN | 218215756 | U | 1/2023 |
| DE | 202019105538 | U1 | 1/2020 |
| TW | 202123559 | A | 6/2021 |

* cited by examiner

ELECTRICAL CONNECTOR ASSEMBLY WITH IMPROVED LIQUID COOLING PLATE

CROSS-REFERENCE TO RELATED APPLICATION

This patent application claims priority of a Chinese Patent Application No. 202310693538.4, filed on Jun. 12, 2023 and titled "ELECTRICAL CONNECTOR ASSEMBLY", the entire content of which is incorporated herein by reference.

TECHNICAL FIELD

The present disclosure relates to an electrical connector assembly, which belongs to a technical field of connectors with liquid cooling function.

BACKGROUND

With the rapid development of electronic information technology, the heat flux density of electronic equipment is increasing, and a large amount of heat will be generated during use, resulting in an increase in its temperature. However, when the temperature is too high, the reliability and service life of electronic components will be reduced. Therefore, effective heat dissipation of electronic components is crucial.

The electrical connectors in the related art mostly adopt air cooling to dissipate heat. However, the ability of air cooling to dissipate heat is weak, and it is increasingly difficult to meet the heat dissipation requirements of high power consumption.

SUMMARY

An object of the present disclosure is to provide an electrical connector assembly with improved heat dissipation capability.

In order to achieve the above object, the present disclosure adopts the following technical solution: an electrical connector assembly, including: an electrical connector including an insulating body, a plurality of conductive terminals and a metal shielding cage covering the insulating body; the insulating body including a mating surface and a mating slot extending through the mating surface; each conductive terminal including a contact portion extending into the mating slot; the metal shielding cage including a receiving cavity communicating with the mating slot; the receiving cavity and the mating slot being configured to jointly receive a mating plug along a mating direction; and a liquid cooling plate at least partially covering the metal shielding cage, the liquid cooling plate including a cooling liquid inlet and a cooling liquid outlet; the liquid cooling plate including a liquid cooling base plate and a cover plate fixed to the liquid cooling base plate; the liquid cooling base plate including a first inlet flow channel, a second inlet flow channel and an outlet flow channel; the first inlet flow channel and the second inlet flow channel being fluidly arranged in parallel, and communicate with the cooling liquid inlet; the first inlet flow channel and the second inlet flow channel converging into the outlet flow channel which communicates with the cooling liquid outlet.

In order to achieve the above object, the present disclosure adopts the following technical solution: an electrical connector assembly, including: a plurality of electrical connectors disposed at intervals along a width direction, each electrical connector including an insulating body, a plurality of conductive terminals and a metal shielding cage enclosing the insulating body; the insulating body including a mating surface and a mating slot extending through the mating surface; each conductive terminal including an elastic contact portion extending into the mating slot; the metal shielding cage including a receiving cavity communicating with the mating slot; the receiving cavity and the mating slot being configured to jointly receive a mating plug along a mating direction; and a metal liquid cooling plate being attached to top walls of the metal shielding cages of the plurality of electrical connectors; the liquid cooling plate including a cooling liquid inlet and a cooling liquid outlet; the liquid cooling plate including a liquid cooling base plate and a cover plate fixed to the liquid cooling base plate; the liquid cooling base plate including a first inlet flow channel, a second inlet flow channel and an outlet flow channel; the first inlet flow channel and the second inlet flow channel being fluidly arranged in parallel, and communicate with the cooling liquid inlet; the first inlet flow channel and the second inlet flow channel converging into the outlet flow channel which communicates with the cooling liquid outlet.

Compared with the prior art, the present disclosure provides the liquid cooling plate including a cooling liquid inlet and a cooling liquid outlet. The liquid cooling plate includes a liquid cooling base plate and a cover plate fixed on the liquid cooling base plate. The liquid cooling base plate includes a first inlet flow channel, a second inlet flow channel and an outlet flow channel. Wherein the first inlet flow channel and the second inlet flow channel are arranged in parallel, and communicate with the cooling liquid inlet. The first inlet flow channel and the second inlet flow channel converge into the outlet flow channel. The outlet flow channel communicates with the cooling liquid outlet. With such arrangement, the heat dissipation capability of the electrical connector assembly is improved by providing the liquid cooling plate.

DETAILED DESCRIPTION

Figure 1:
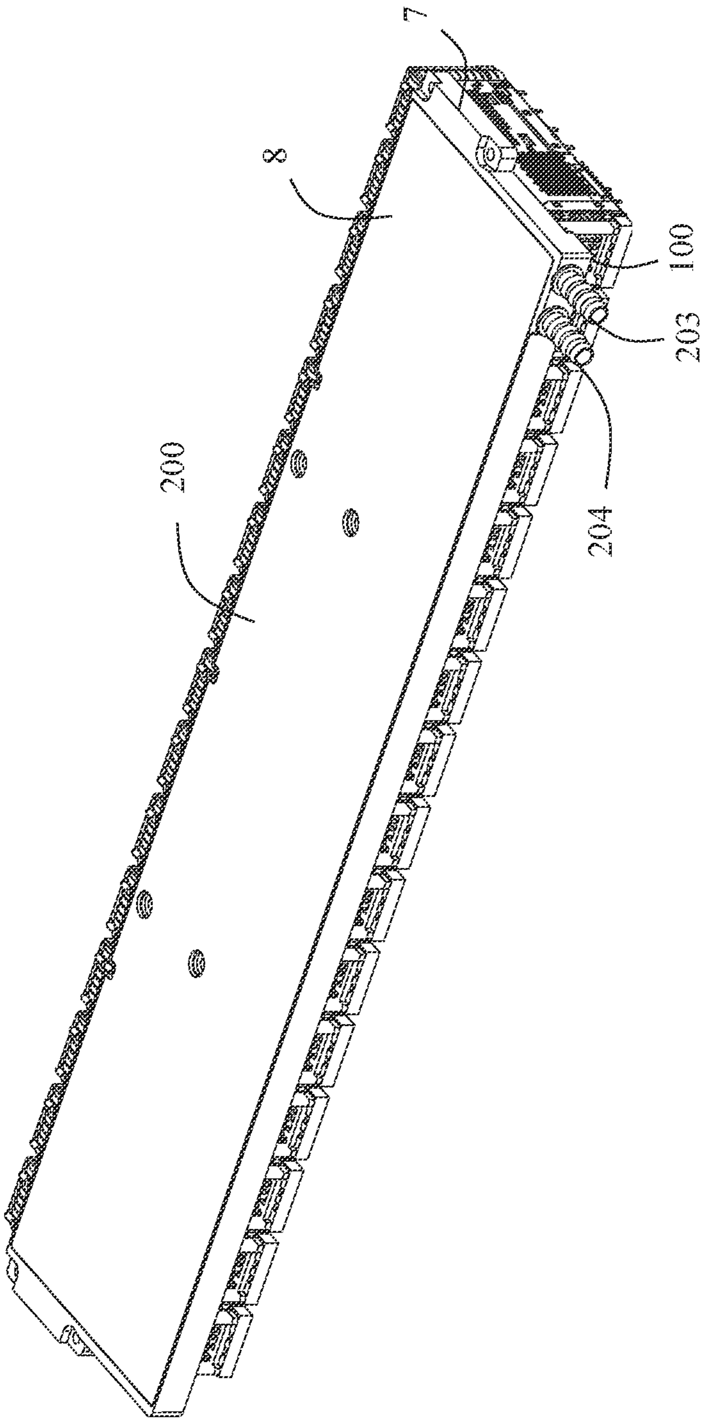
FIG. 1 is a schematic perspective view of an electrical connector assembly in accordance with an embodiment of the present disclosure.
Figure 2:
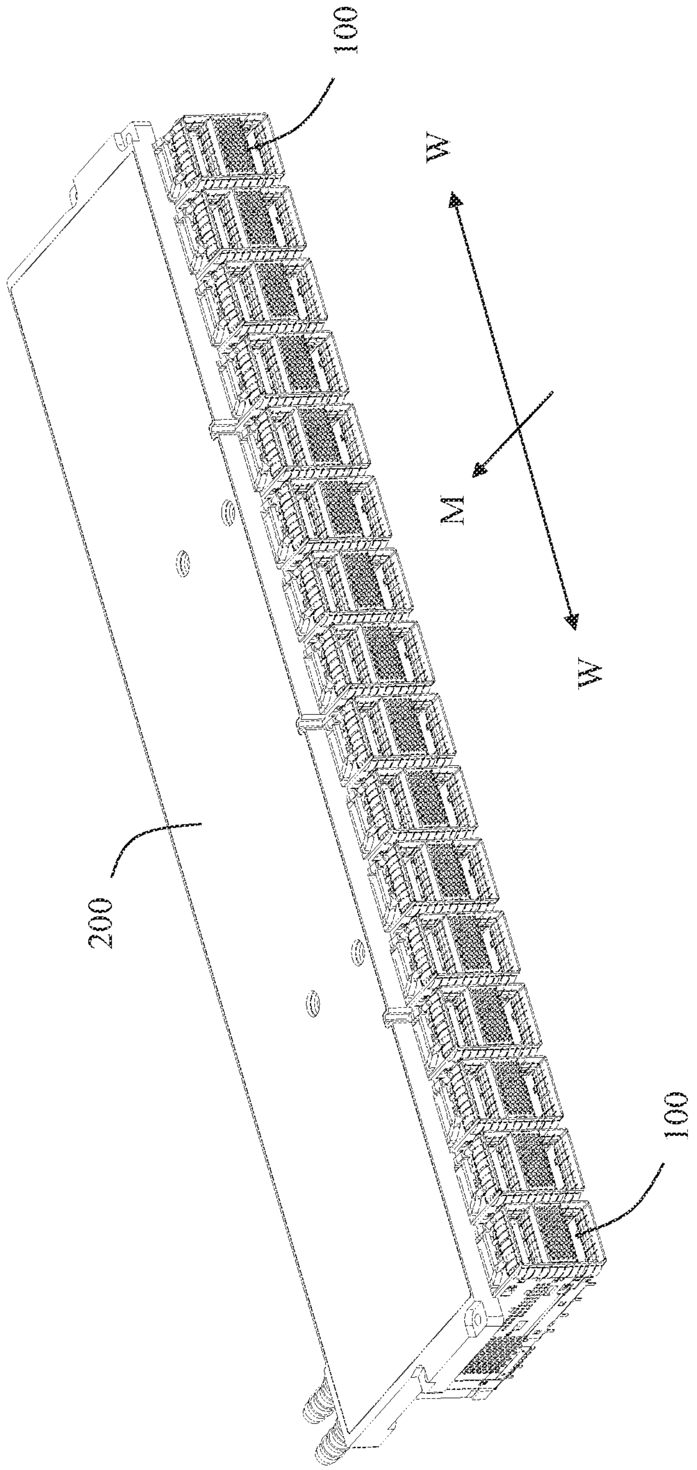
FIG. 2 is a schematic perspective view of FIG. 1 from another angle.
Figure 3:
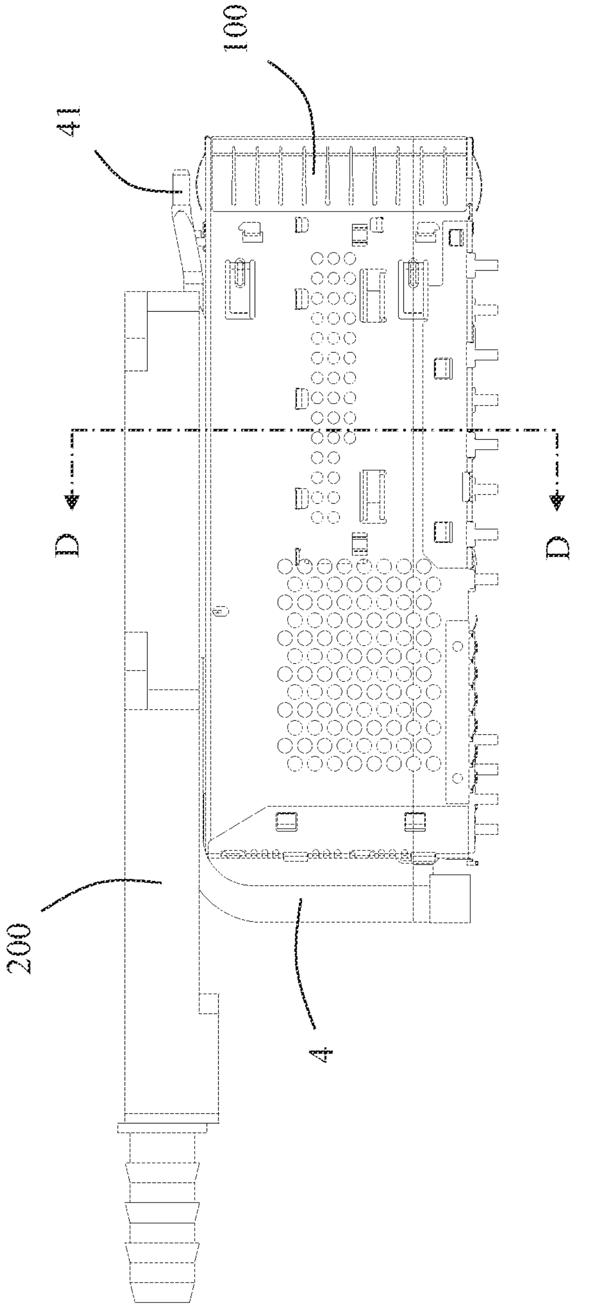
FIG. 3 is a right view of FIG. 1.
Figure 4:
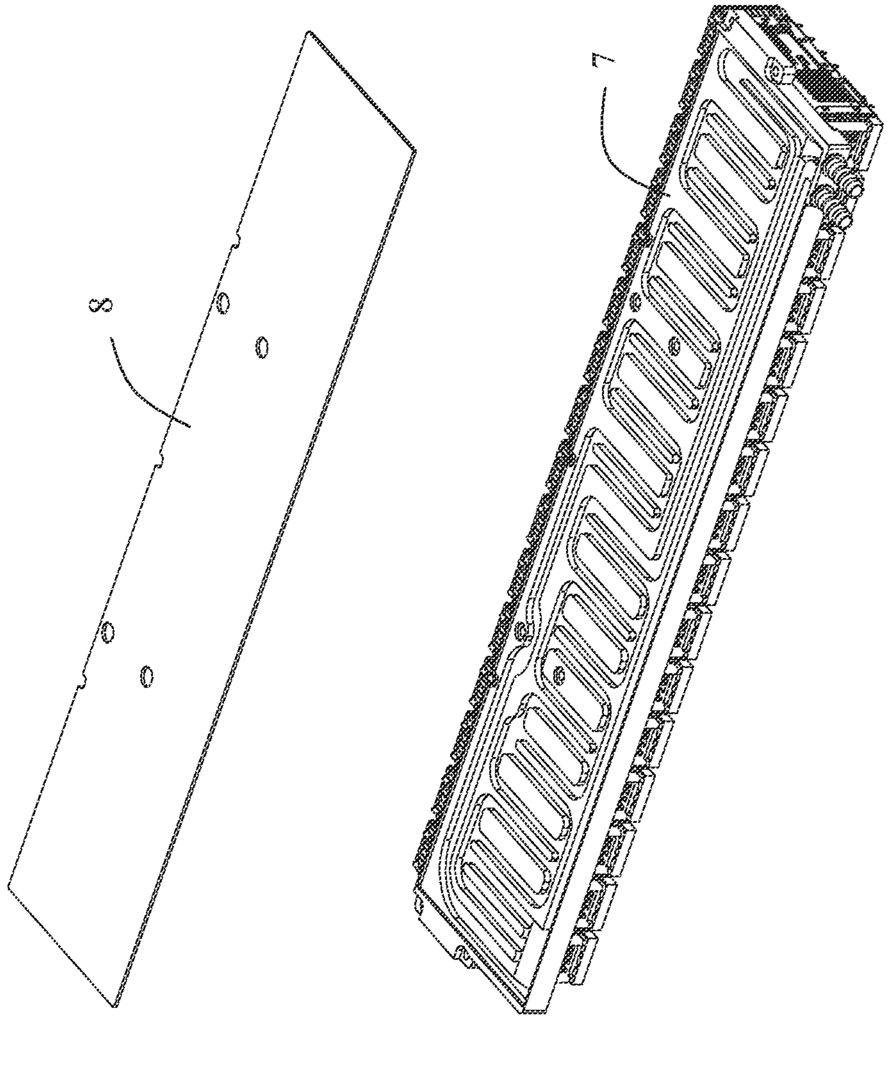
FIG. 4 is a partial perspective exploded view of FIG. 1, wherein a cover plate is separated.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 17:
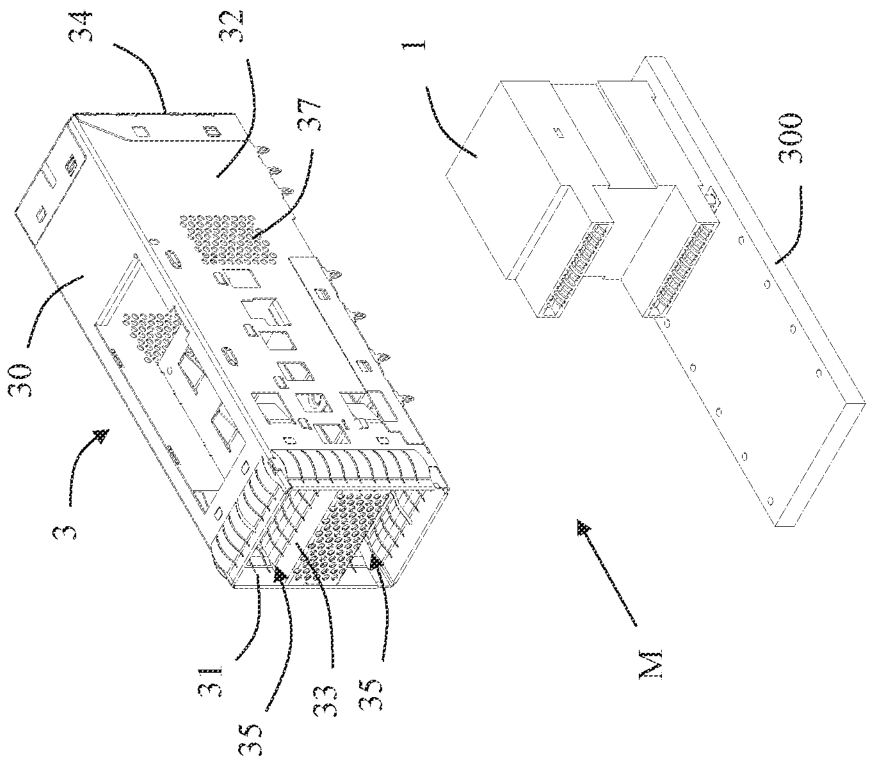
FIG. 17 is a partially exploded perspective view of an electrical connector and a circuit board in accordance with an embodiment of the present disclosure.

Referring to FIG. 1 to FIG. 21, the present disclosure discloses an electrical connector assembly, which includes an electrical connector 100 and a liquid cooling plate 200 installed on the electrical connector 100. The electrical connector 100 is configured to be mounted on a circuit board 300 (as shown in FIG. 17). In an illustrated embodiment of the present disclosure, a plurality of electrical connectors 100 are provided and arranged side by side along a width direction W-W (for example, a left-right direction). The electrical connector 100 may be an SFP (Small Form Pluggable) receptacle connector, a QSFP (Quad Small Form-factor Pluggable) receptacle connector, an OSFP (Octal Small Form Factor Pluggable) receptacle connector, a QSFP-DD (Quad Small Form Factor Pluggable-Double Density) receptacle connector, a SFP-DD (Small Form-Factor Pluggable-Double Density) receptacle connector or a DSFP (Dual Chanel Small Form-factor Pluggable) receptacle connector, etc. Of course, it is understandable to those skilled in the art that the electrical connector 100 can also be other types of electrical connectors, which will not be repeated in the present disclosure.

In the illustrated embodiment of the present disclosure, the plurality of electrical connectors 100 have the same structure, and only one of the electrical connectors 100 will be described below as an example.

Referring to FIG. 3 to FIG. 8 and FIG. 17 to FIG. 21, the electrical connector 100 includes an insulating body 1, a plurality of conductive terminals 2, a metal shielding cage 3 covering the insulating body 1, and a light guide element 4 installed on the metal shielding cage 3.

Figure 18:
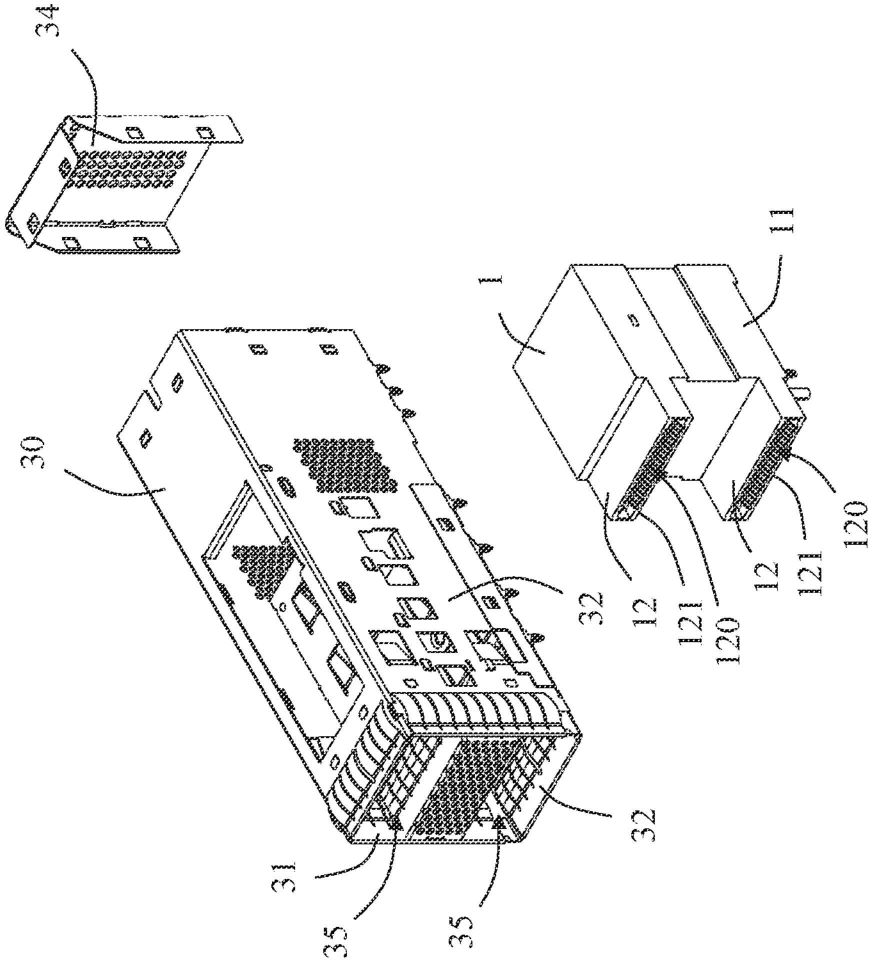
FIG. 18 is a further partial perspective exploded view after removing the circuit board in FIG. 17.

Referring to FIG. 18, in an embodiment of the present disclosure, the insulating body 1 includes a base portion 11 and a protruding portion 12 protruding from the base portion 11. The protruding portion 12 has a mating surface 121 and a mating slot 120 extending through the mating surface 121. In one embodiment of the present disclosure, only one protruding portion 12 is provided; and at this time, the electrical connector 100 is a connector with a single port. In the illustrated embodiment of the present disclosure, two protruding portions 12 are provided; and at this time, the electrical connector 100 is a connector with two ports.

Figure 21:
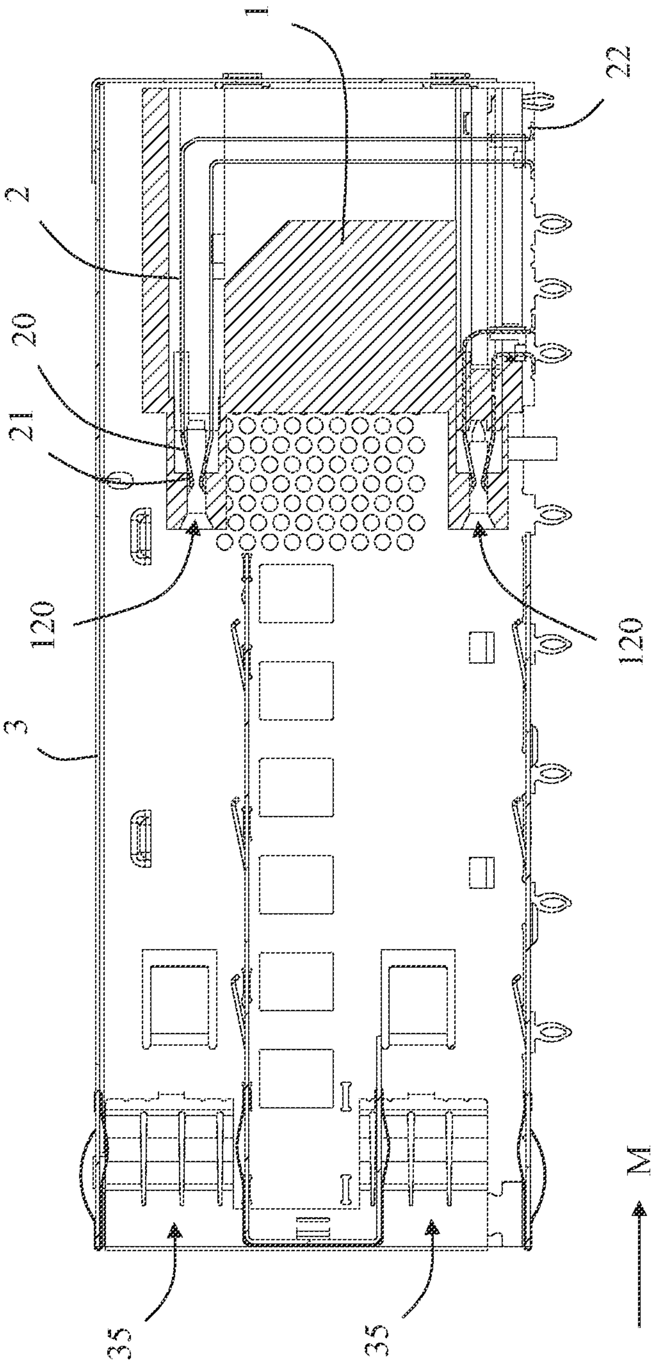
FIG. 21 is a schematic cross-sectional view taken along line F-F in FIG. 20.

Referring to FIG. 21, the plurality of conductive terminals 2 are installed to the insulating body 1. It is understandable to those skilled in the art that the plurality of conductive terminals 2 can be directly assembled to the insulating body 1. Alternatively, the plurality of conductive terminals 2 and an insulating block are formed into a terminal module, and then assembled to the insulating body 1. Each conductive terminal 2 includes an elastic contact portion 21 extending into the mating slot 120 and a tail portion 22 configured to be mounted on the circuit board 300. In the illustrated embodiment of the present disclosure, each conductive terminal 2 includes an elastic arm 20. The contact portion 21 is disposed on the elastic arm 20 of the conductive terminal 2.

Figure 19:
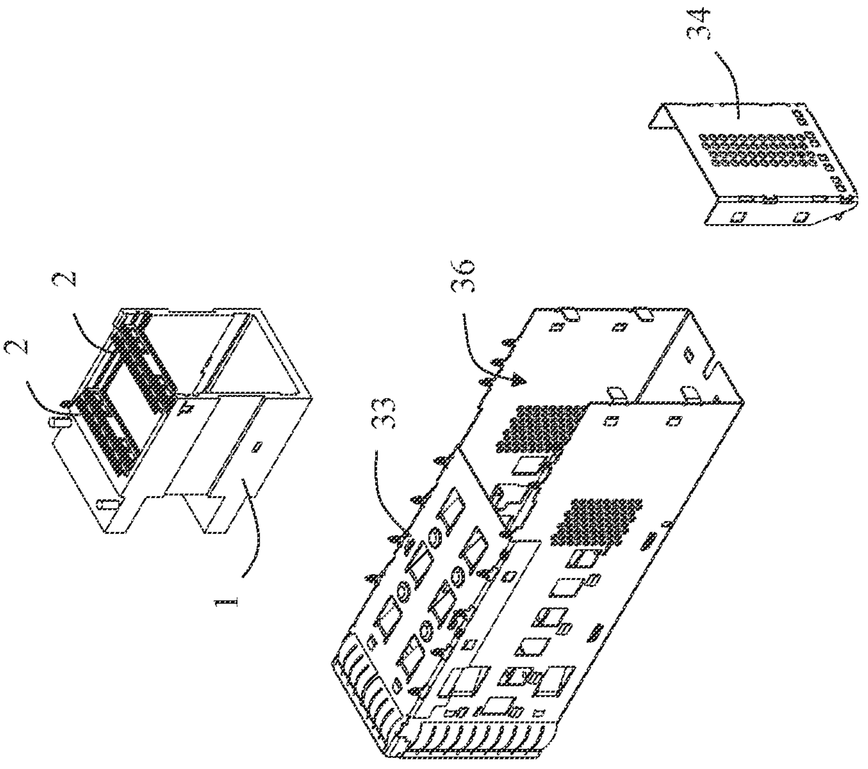
FIG. 19 is a partial perspective exploded view of FIG. 18 from another angle.
Figure 20:
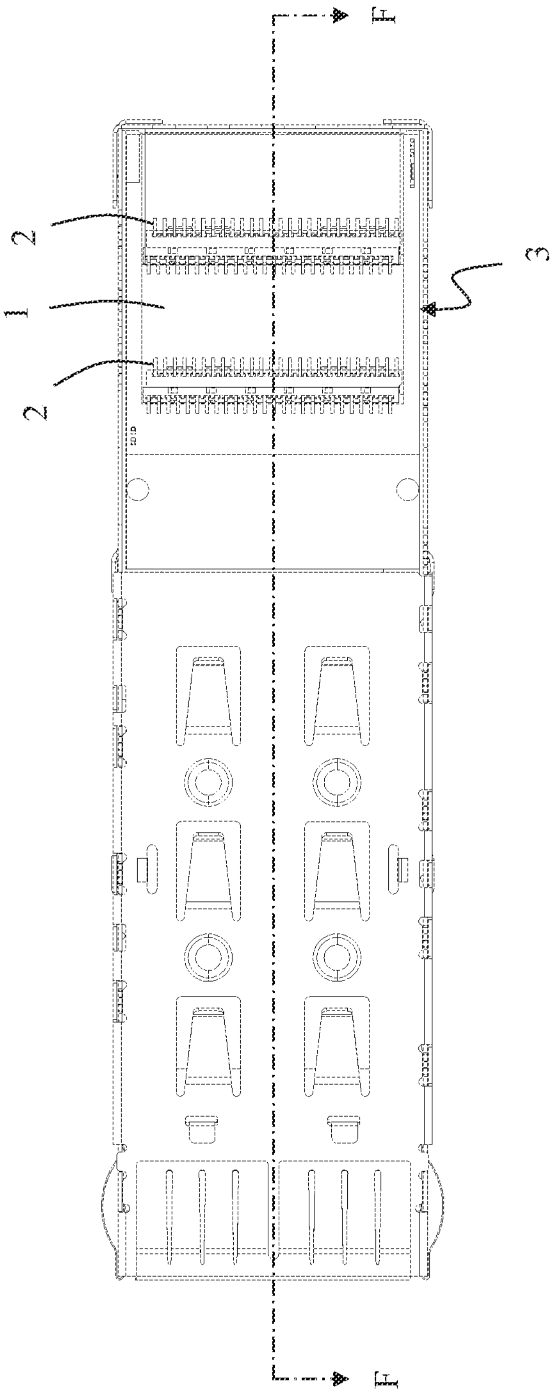
FIG. 20 is a bottom view of the electrical connector in accordance with an embodiment of the present disclosure.

Referring to FIG. 17 to FIG. 19, the metal shielding cage 3 includes a top wall 30, a first side wall 31, a second side wall 32 opposite to the first side wall 31, a bottom wall 33 opposite to the top wall 30, and a rear wall 34. The metal shielding cage 3 includes a receiving cavity 35 surrounded by the top wall 30, the first side wall 31, the second side wall 32 and the bottom wall 33. The bottom wall 33 defines an installation opening 36 at a rear end of the receiving cavity 35. The installation opening 36 is used for installing the insulating body 1. The receiving cavity 35 is located at a front end of the mating slot 120. The receiving cavity 35 communicates with the mating slot 120 and is configured to receive a mating plug (not shown) along a mating direction M (for example, a front-to-back direction). At least one of the top wall 30, the first side wall 31, the second side wall 32 and the rear wall 34 is provided with a plurality of perforations 37 to facilitate airflow and heat dissipation. The metal shielding cage 3 is used for being fixed to the circuit board 300. Preferably, the insulating body 1 is disposed in the metal shielding cage 3 to improve the shielding effect.

Figure 5:
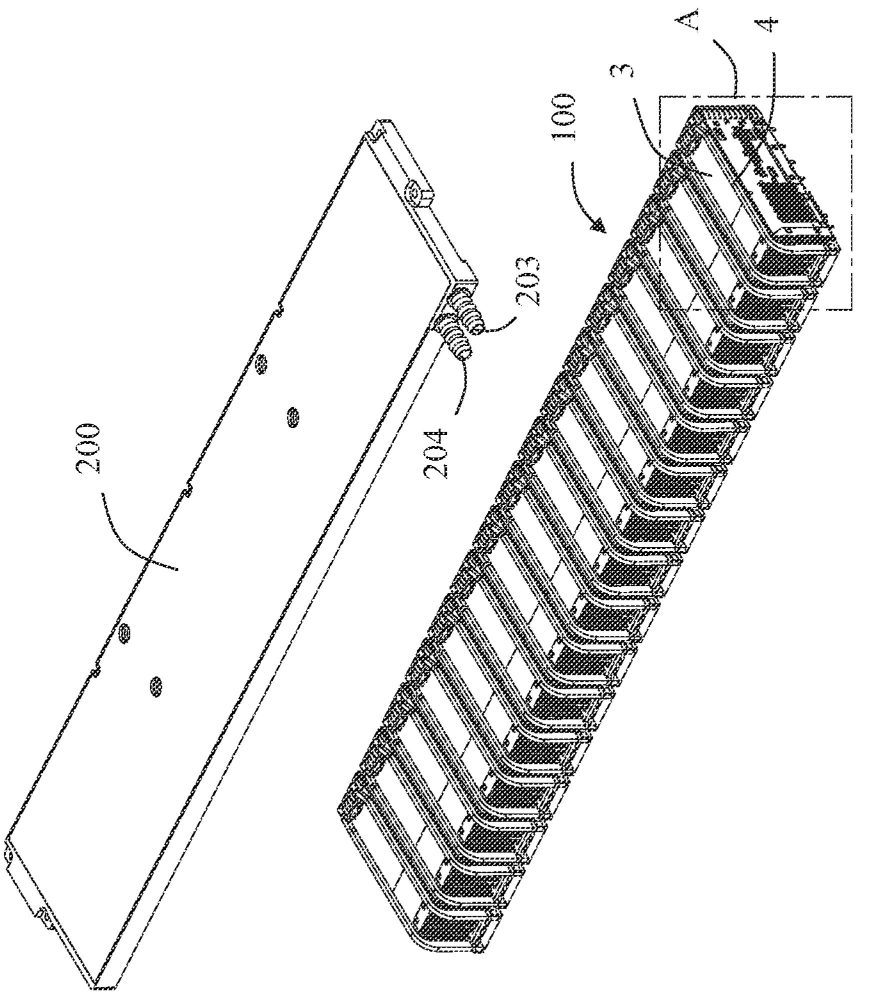
FIG. 5 is a partially exploded perspective view of another mode of FIG. 1, wherein a liquid cooling plate, an inlet joint and an outlet joint are separated.
Figure 6:
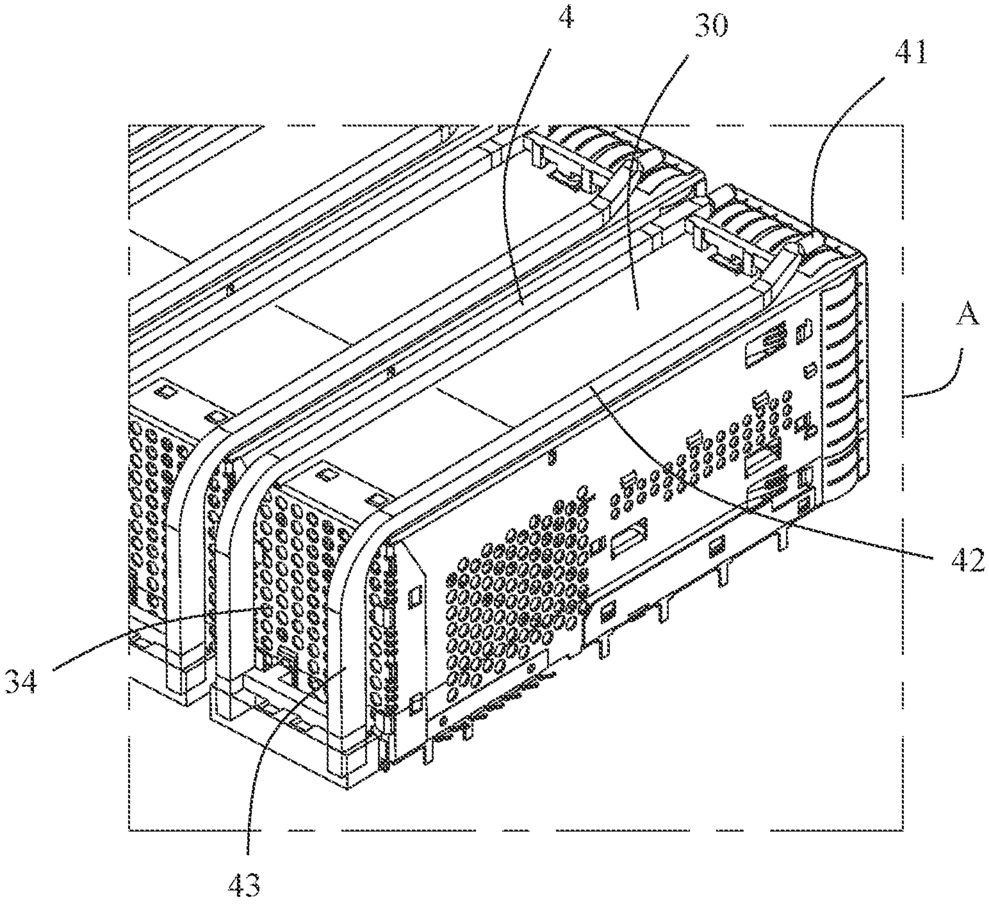
FIG. 6 is a partial enlarged view of frame part A in FIG. 5.
Figure 7:
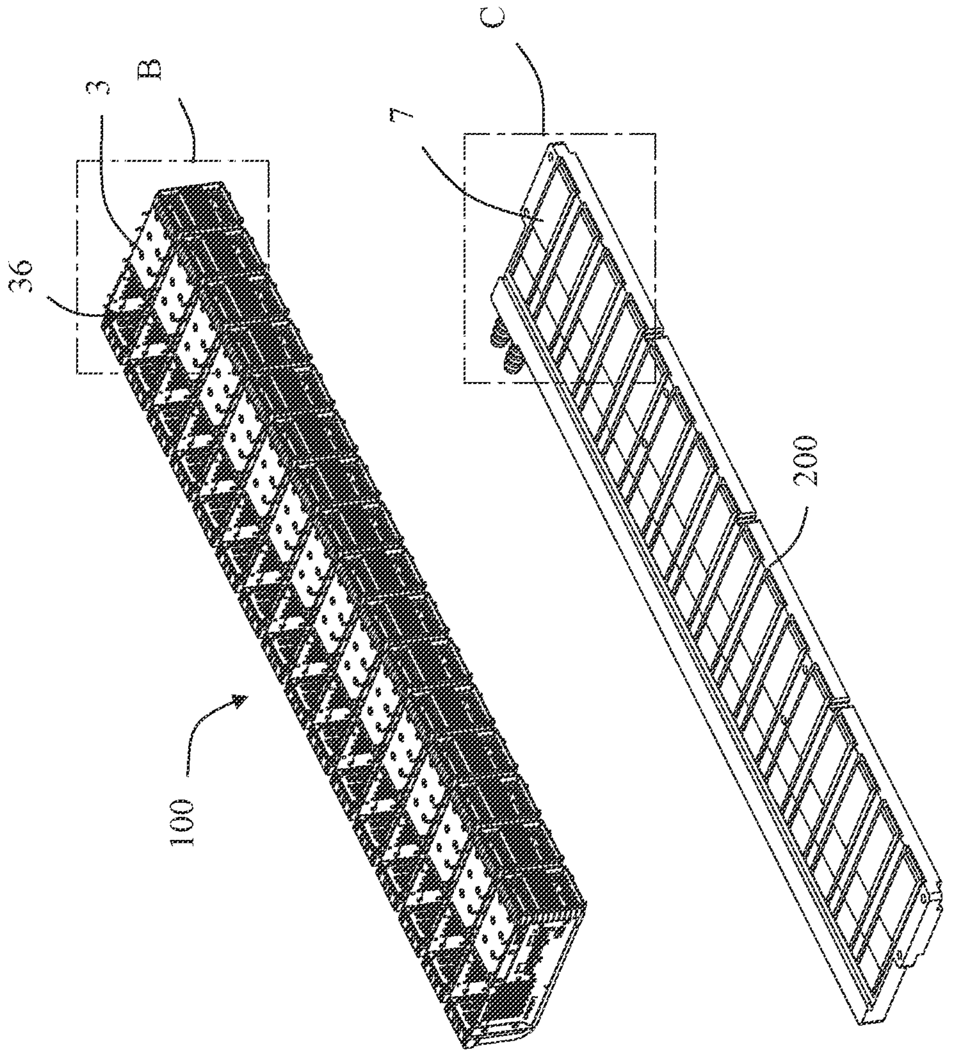
FIG. 7 is a partial perspective exploded view of FIG. 5 from another angle.
Figure 8:
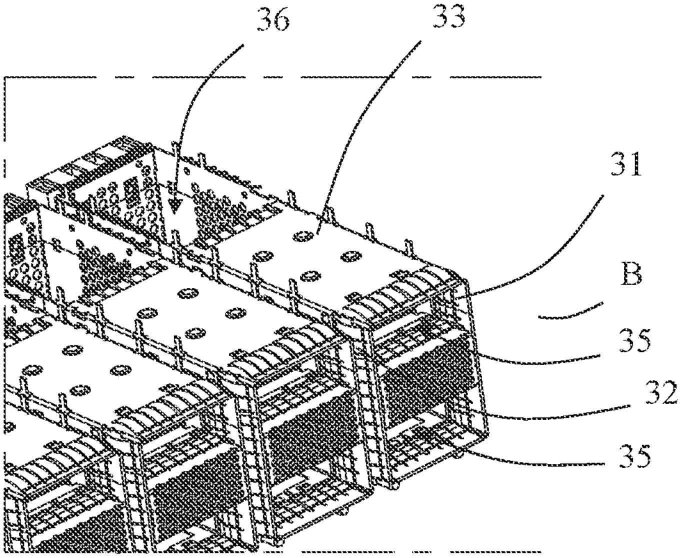
FIG. 8 is a partially enlarged view of frame part B in FIG. 7.
Figure 9:
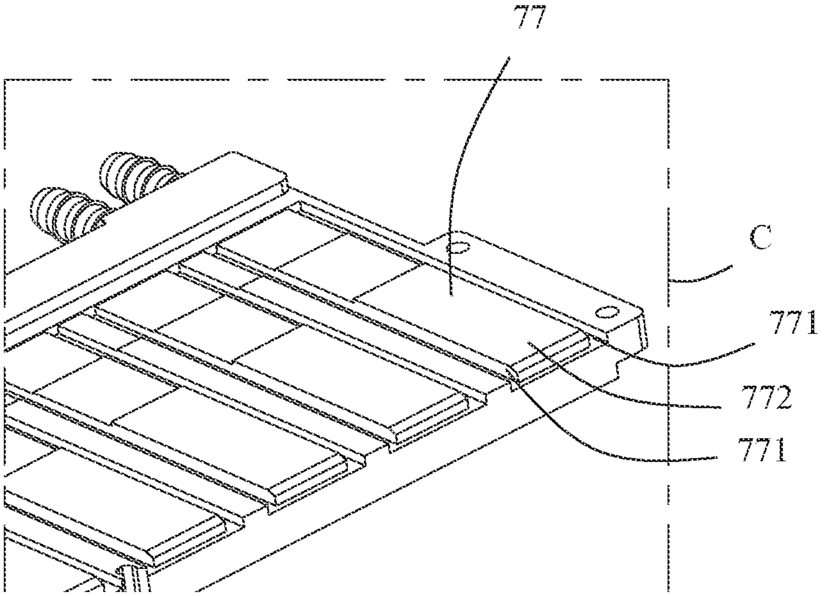
FIG. 9 is a partially enlarged view of frame part C in FIG. 7.
Figure 10:
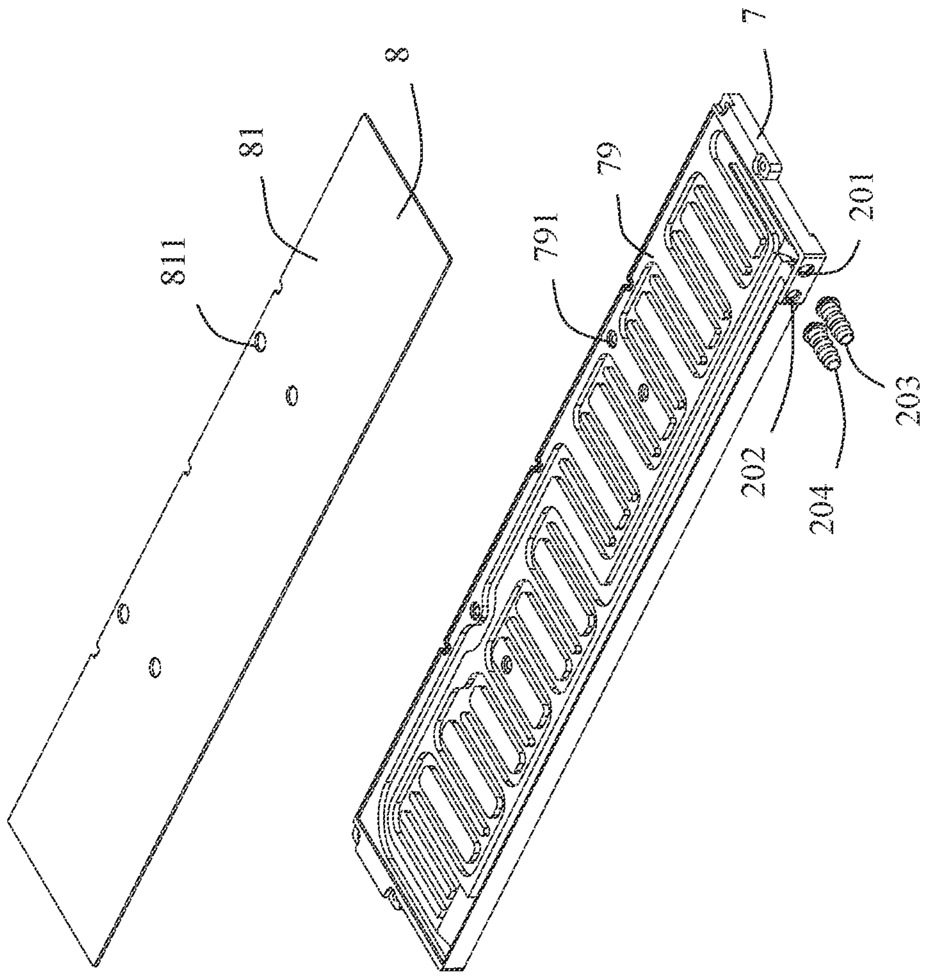
FIG. 10 is a perspective exploded view of a liquid cooling base plate, the cover plate, the inlet joint and the outlet joint in FIG. 1.
Figure 14:
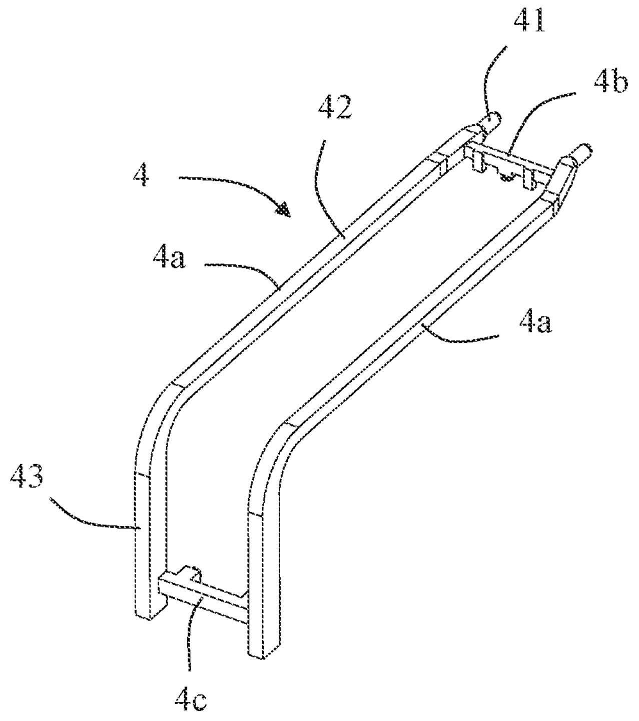
FIG. 14 is a schematic perspective view of a light guide element in FIG. 5.
Figure 15:
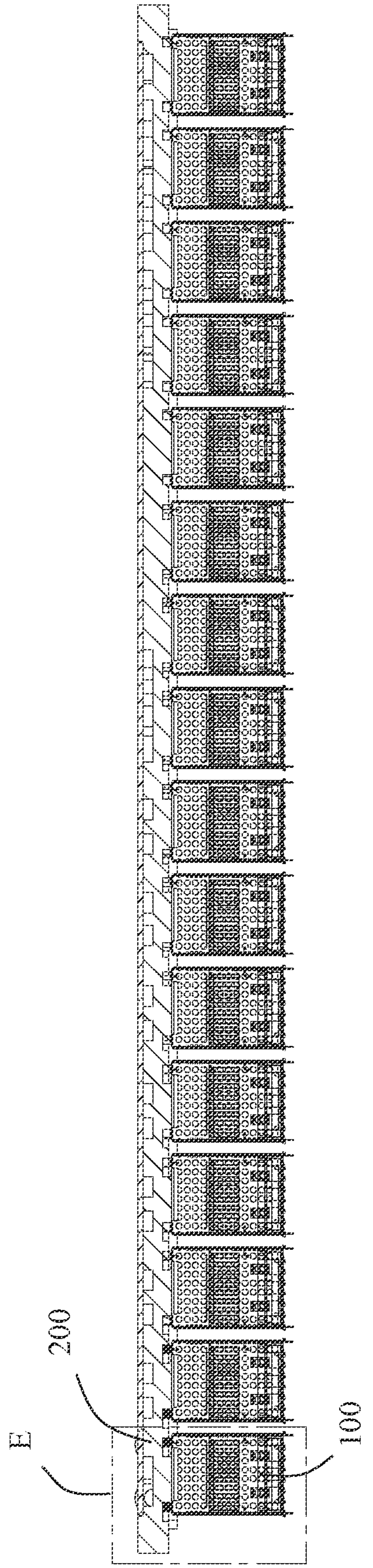
FIG. 15 is a schematic cross-sectional view taken along line D-D in FIG. 3.
Figure 16:
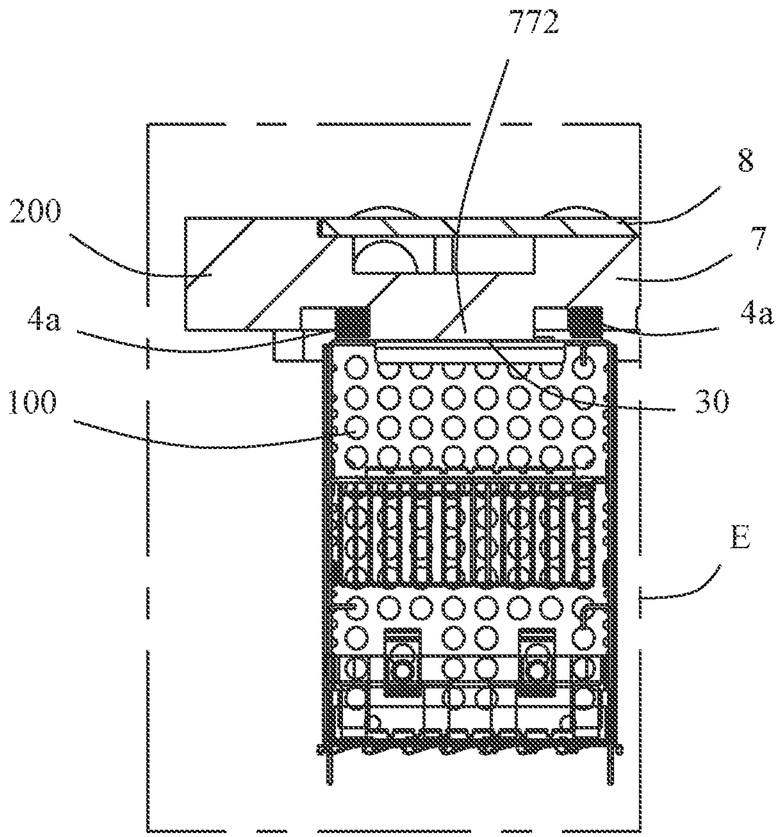
FIG. 16 is a partial enlarged view of frame part E in FIG. 15.

Referring to FIG. 5, FIG. 6 and FIG. 14, in the embodiment shown in the present disclosure, the light guide element 4 includes two light guide pipes 4*a* arranged side by side, a first connecting pipe 4*b* connecting the two light guide pipes 4*a* and disposed adjacent to one end of the two light guide pipes 4*a*, and a second connecting pipe 4*c* connecting the two light guide pipes 4*a* and disposed adjacent to another end of the two light guide pipes 4*a*. The first connecting pipe 4*b* is erected on the top wall 30 of the metal shielding cage 3. The second connecting pipe 4*c* is attached to the rear wall 34 of the metal shielding cage 3.

Each light guide pipe 4*a* includes a head 41, an extending portion 42 extending from the head 41 and a bent portion 43 bent from the extending portion 42. The head 41 is erected on the top wall 30 of the metal shielding cage 3 through the first connecting pipe 4*b*. The extending portion 42 is deflected toward the top wall 30 of the metal shielding cage 3 so as to be attached to the top wall 30 of the metal shielding cage 3. In the illustrated embodiment of the present disclosure, the extending portion 42 is bent downward to fit the top wall 30 of the metal shielding cage 3. The bent portion 43 is located at a rear end of the rear wall 34 of the metal shielding cage 3. The head 41 is disposed upwardly higher than the extending portion 42 for identification.

The liquid cooling plate 200 covers most of the metal shielding cage 3. A front end of the metal shielding cage 3 (for example, a position adjacent to an insertion opening) protrudes forwardly beyond the liquid cooling plate 200. Preferably, the liquid cooling plate 200 is made of a metal material with better heat dissipation performance. The liquid cooling plate 200 is supported on the extending portion 42. In the illustrated embodiment of the present disclosure, by deflecting the extending portion 42 downwardly, on the one hand, the contact area between the light guide pipes 4*a* and the top wall 30 of the metal shielding cage 3 is increased, thereby facilitating heat dissipation; and on the other hand, more space is provided for the liquid cooling plate 200 located above, which is beneficial to optimize the design of the liquid cooling plate 200.

Referring to FIG. 1 to FIG. 13, the liquid cooling plate 200 includes a cooling liquid inlet 201 and a cooling liquid outlet 202. The liquid cooling plate 200 includes a liquid cooling base plate 7 and a cover plate 8 fixed on the liquid cooling base plate 7. The liquid cooling base plate 7 includes a first inlet flow channel 71, a second inlet flow channel 72 and an outlet flow channel 73. The first inlet flow channel 71 and the second inlet flow channel 72 are arranged in parallel, and communicate with the cooling liquid inlet 201. The first inlet flow channel 71 and the second inlet flow channel 72 converge into the outlet flow channel 73. The outlet flow channel 73 communicates with the cooling liquid outlet 202. The cooling liquid inlet 201 is disposed on the liquid cooling base plate 7 and/or the cover plate 8. The cooling liquid outlet 202 is disposed on the liquid cooling base plate 7 and/or the cover plate 8. In the illustrated embodiment of the present disclosure, the cooling liquid inlet 201 and the cooling liquid outlet 202 are both disposed on the liquid cooling base plate 7. The electrical connector assembly further includes an inlet joint 203 which is fixed to the liquid cooing plate 200 and communicates with the cooling liquid inlet 201, and an outlet joint 204 which is fixed to the liquid cooling plate 200 and communicates with the cooling liquid outlet 202. In the illustrated embodiment of the present disclosure, the inlet joint 203 and the outlet joint 204 are disposed adjacent to each other to improve heat exchange.

The liquid cooling base plate 7 includes a first surface 78 and a recessed portion 79 recessed from the first surface 78. The first inlet flow channel 71, the second inlet flow channel 72 and the outlet flow channel 73 are located in the recessed portion 79. The cover plate 8 is installed in the recessed portion 79. The cover plate 8 has a second surface 81. After the cover plate 8 is installed on the liquid cooling base plate 7, the second surface 81 is flush with the first surface 78 to save space. The liquid cooling base plate 7 includes a plurality of first holes 791 exposed in the recessed portion 79. The cover plate 8 defines a plurality of second holes 811 extending through the second surface 81. The electrical connector assembly includes a plurality of fasteners (for example, screws) fixed in the second holes 811 and the first holes 791.

Figure 11:
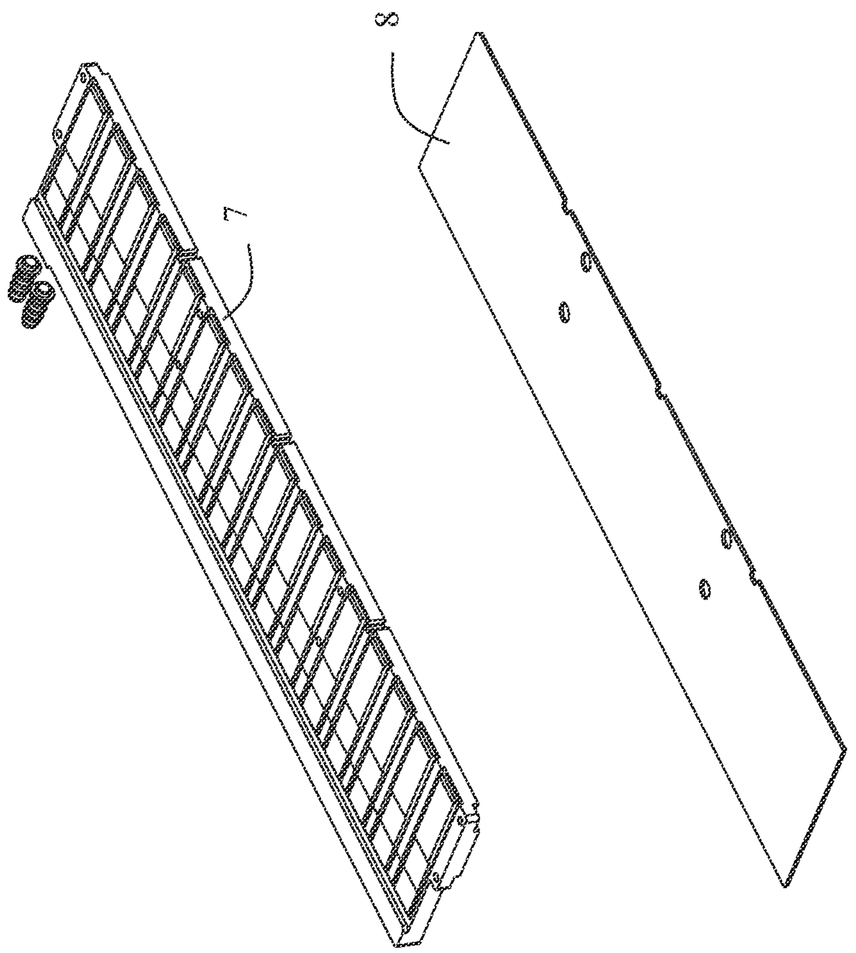
FIG. 11 is a perspective exploded view of FIG. 10 from another angle.

Referring to FIG. 11, the liquid cooling base plate 7 further includes a third surface 77 opposite to the first surface 78. In the illustrated embodiment of the present disclosure, the first surface 78 is an upper surface, and the third surface 77 is a lower surface. The liquid cooling base plate 7 further includes a plurality of grooves 771 recessed from the third surface 77 toward the first surface 78, and a plurality of middle portions 772 of which each is located between two adjacent grooves 771. The groove 771 is used for receiving the extending portion 42 of a corresponding light guide pipe 4*a*. The middle portion 772 is attached to the top wall 30 of the metal shielding cage 3 to achieve better heat dissipation.

Figure 12:
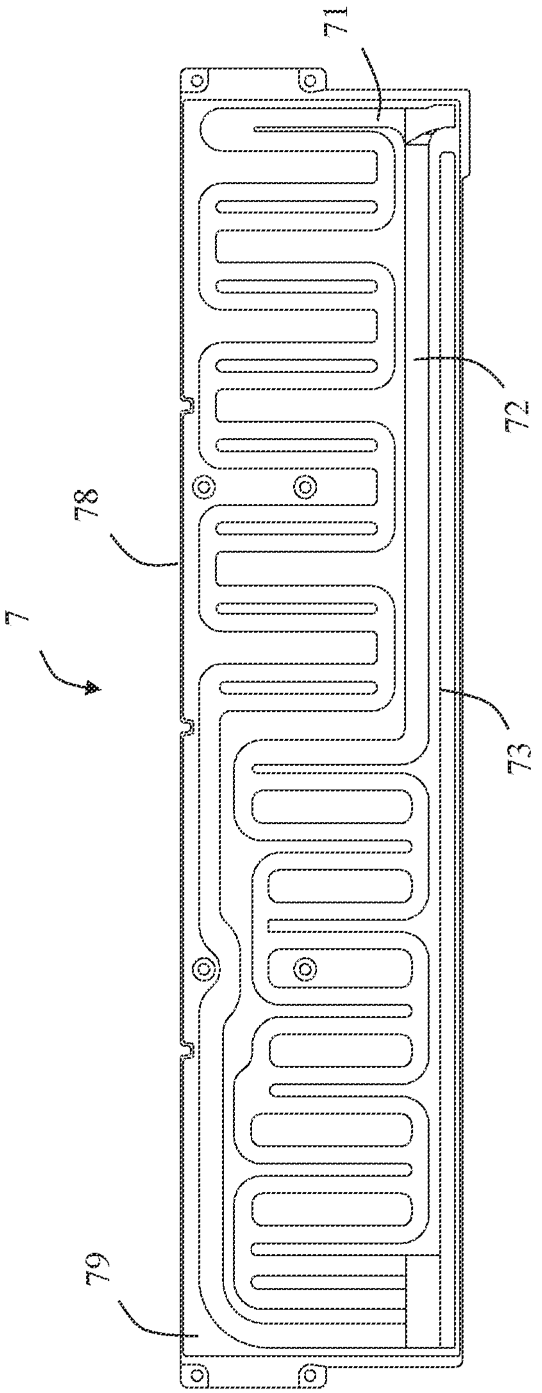
FIG. 12 is a top view of the liquid cooling base plate in FIG. 10.
Figure 13:
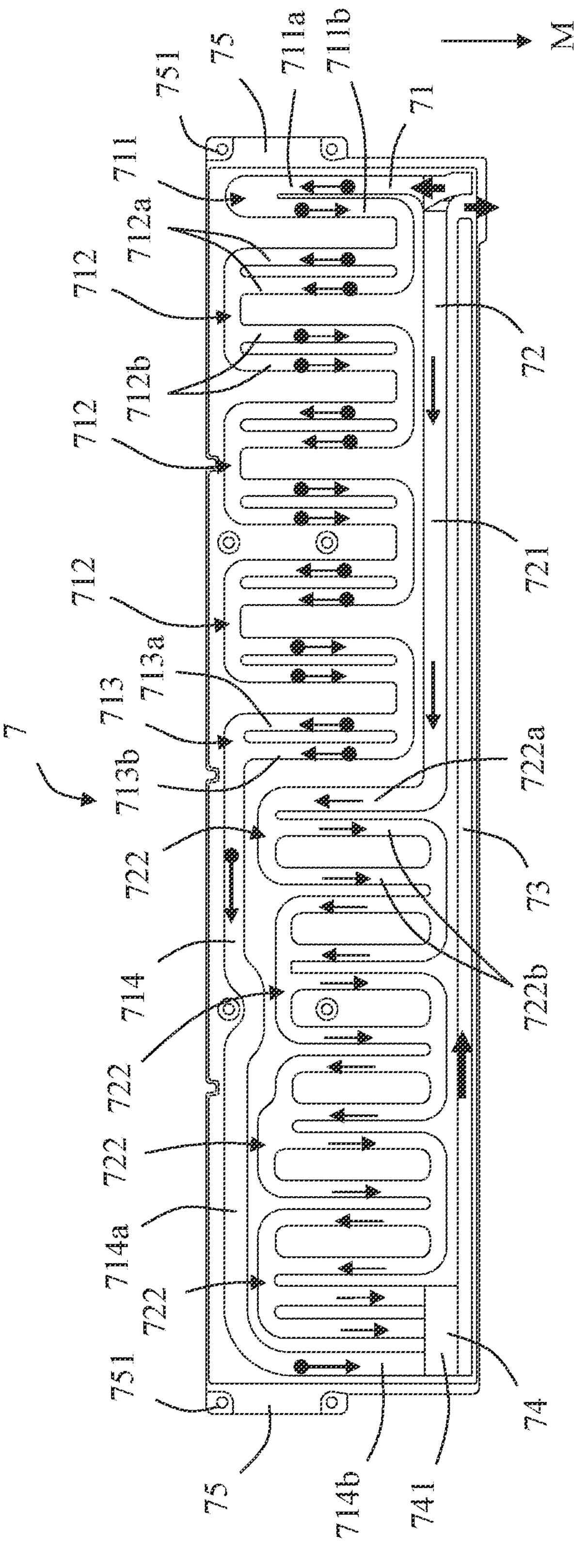
FIG. 13 is a top view of the liquid cooling base plate in FIG. 10, and indicates flow directions of a cooling liquid.

Referring to FIG. 12 and FIG. 13, the first inlet flow channel 71 includes a first flow channel cavity 711 formed on the liquid cooling base plate 7, a second flow channel cavity 712 formed on the liquid cooling base plate 7, a third flow channel cavity 713 formed on the liquid cooling base plate 7, and a converging channel 714 formed on the liquid cooling base plate 7. In the illustrated embodiment of the present disclosure, the first flow channel cavity 711 communicates with the inlet joint 203. The first flow channel cavity 711, the second flow channel cavity 712, the third flow channel cavity 713 and the converging channel 714 are sequentially arranged in series along a flow direction of the cooling liquid. That is, the first flow channel cavity 711 is communicated in series downstream of the inlet joint 203; the second flow channel cavity 712 is communicated in series downstream of the first flow channel cavity 711; the third flow channel cavity 713 is communicated in series downstream of the second flow channel cavity 712; and the converging channel 714 is communicated in series downstream of the third flow channel cavity 713.

Specifically, in the illustrated embodiment of the present disclosure, the first flow channel cavity 711 includes a first flow channel 711*a* and a second flow channel 711*b* arranged side by side with the first flow channel 711*a*. The first flow channel 711*a* communicates with the second flow channel 711*b*. Flow directions of the cooling liquid in the first flow channel 711*a* and the second flow channel 711*b* are opposite so as to improve heat exchange.

In the illustrated embodiment of the present disclosure, the second flow channel cavity 712 includes two third flow channels 712*a* arranged side by side and two fourth flow channels 712*b* arranged side by side. The two third flow channels 712*a* and the two fourth flow channels 712*b* are arranged side by side as a whole. The two third flow channels 712*a* communicate with the two fourth flow channels 712*b*. Flow directions of the cooling liquid in the two third flow channels 712*a* are the same; Flow directions of the cooling liquid in the two fourth channels 712*b* are the same; and flow directions of the cooling liquid in the third flow channels 712_a_ and the fourth flow channels 712_b_ are opposite so as to improve heat exchange.

In the embodiment shown in the present disclosure, the third flow channel cavity 713 includes a fifth flow channel 713_a_ and a sixth flow channel 713_b_ arranged side by side with the fifth flow channel 713_a_. The fifth flow channel 713_a_ communicates with the sixth flow channel 713_b_. Flow directions of the cooling liquid in the fifth flow channel 713_a_ and the sixth flow channel 713_b_ are the same.

In the illustrated embodiment of the present disclosure, the converging channel 714 is substantially L-shaped, and includes a first converging flow channel 714_a_ and a second converging flow channel 714_b_. The first converging flow channel 714_a_ is communicated in series downstream of the third converging flow channel cavity 713. The second converging flow channel 714_b_ is communicated in series downstream of the first converging flow channel 714_a_.

In the illustrated embodiment of the present disclosure, the first flow channel cavity 711, the second flow channel cavity 712 and the third flow channel cavity 713 jointly form an S-shaped flow channel so as to improve heat exchange. In the illustrated embodiment of the present disclosure, there is one first flow channel cavity 711; there is one third flow channel cavity 713;

and there are a plurality of second flow channel cavities 712.

In the illustrated embodiment of the present disclosure, the second inlet flow channel 72 includes a flow guide channel 721 formed on the liquid cooling base plate and a fourth flow channel cavity 722 formed on the liquid cooling base plate 7. The flow guide channel 721 is communicated in series upstream of the fourth flow channel cavity 722. The flow guide channel 721 communicates with the inlet joint 203. The fourth flow channel cavity 722 at least includes a seventh flow channel 722_a_ and an eighth flow channel 722_b_ arranged side by side with the seventh flow channel 722_a_. Flow directions of the cooling liquid in the seventh flow channel 722_a_ and the eighth flow channel 722_b_ are opposite. In the illustrated embodiment of the present disclosure, there are a plurality of fourth flow channel cavities 722. Some of the fourth flow channel cavities 722 have one seventh flow channel 722_a_ and two eighth flow channels 722_b_; and some of the fourth flow channel cavities 722 have two seventh flow channels 722_a_ and two eighth flow channels 722_b_. In the illustrated embodiment of the present disclosure, the plurality of fourth channel cavities 722 jointly form an S-shaped channel to improve heat exchange.

The liquid cooling base plate 7 defines a collection cavity 74. The collection cavity 74 communicates with an outlet of the second converging flow channel 714_b_ and outlets of the fourth flow channel cavities 722. The outlet flow channel 73 communicates with the collection cavity 74. In the illustrated embodiment of the present disclosure, the liquid cooling base plate 7 includes a guide inclined surface 741 located in the collection cavity 74 to facilitate the cooling liquid flowing out from the collection cavity 74 and the second converging flow channel 714_b_ into the collection cavity 74.

In the illustrated embodiment of the present disclosure, the outlet flow channel 73, the flow guide channel 721 and the first converging flow channel 714_a_ are parallel to one another, and are sequentially arranged at intervals along a direction opposite to the mating direction M.

In the illustrated embodiment of the present disclosure, the liquid cooling base plate 7 further includes mounting protrusions 75 on two sides thereof. Each mounting protrusion 75 is provided with a mounting hole 751 extending along a vertical direction, so as to mount and fix the electrical connector assembly to other peripheral components.

Compared with the prior art, the present disclosure has the liquid cooling plate 200. The liquid cooling plate 200 includes a cooling liquid inlet 201 and a cooling liquid outlet 202. The liquid cooling plate 200 includes a liquid cooling base plate 7 and a cover plate 8 fixed on the liquid cooling base plate 7. The liquid cooling base plate 7 includes a first inlet flow channel 71, a second inlet flow channel 72 and an outlet flow channel 73. Wherein the first inlet flow channel 71 and the second inlet flow channel 72 are arranged in parallel, and communicate with the cooling liquid inlet 201. The first inlet flow channel 71 and the second inlet flow channel 72 converge into the outlet flow channel 73. The outlet flow channel 73 communicates with the cooling liquid outlet 202. With such arrangement, the heat dissipation capability of the electrical connector assembly is improved by providing the liquid cooling plate 200.

Besides, by fully contacting the liquid cooling plate 200 with upper surfaces of the electrical connectors 100, and through the circulating flow of cooling liquid inside the liquid cooling plate 200, the present disclosure is capable of taking away the heat of the electrical connector 100 itself and the heat generated when the electrical connector 100 is mated with the mating plug. As a result, the temperature of the electronic components is reduced, and it is beneficial to improve the uniformity of the surface temperature of each electrical connector 100.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector assembly, comprising:

an electrical connector comprising an insulating body, a plurality of conductive terminals and a metal shielding cage covering the insulating body; the insulating body comprising a mating surface and a mating slot extending through the mating surface; each conductive terminal comprising a contact portion extending into the mating slot; the metal shielding cage comprising a receiving cavity communicating with the mating slot; the receiving cavity and the mating slot being configured to jointly receive a mating plug along a mating direction; and a liquid cooling plate at least partially covering the metal shielding cage, the liquid cooling plate comprising a cooling liquid inlet and a cooling liquid outlet; the liquid cooling plate comprising a liquid cooling base plate and a cover plate fixed to the liquid cooling base plate; the liquid cooling base plate comprising a first inlet flow channel, a second inlet flow channel and an outlet flow channel; the first inlet flow channel and the second inlet flow channel being fluidly arranged in parallel, and communicate with the cooling liquid inlet; the first inlet flow channel and the second inlet flow channel converging into the outlet flow channel which communicates with the cooling liquid outlet;

wherein the first inlet flow channel comprises a first flow channel cavity formed on the liquid cooling base plate; the first flow channel cavity comprises a first flow channel and a second flow channel arranged side by side with the first flow channel; the first flow channel communicates with the second flow channel;

wherein the first inlet flow channel comprises a second flow channel cavity formed on the liquid cooling base plate; the second flow channel cavity is communicated in series with the first flow channel cavity; the second flow channel cavity comprises two third flow channels arranged side by side and two fourth flow channels arranged side by side; the two third flow channels and the two fourth flow channels are arranged side by side; the two third flow channels communicate with the two fourth flow channels; the cooling liquid flows in a same direction in the two third flow channels; the cooling liquid flows in a same direction in the two fourth flow channels; flow directions of the cooling liquid in the third flow channels and the fourth flow channels are opposite.

2. The electrical connector assembly according to claim 1, wherein the cooling liquid inlet is disposed on the liquid cooling base plate and/or the cover plate; and wherein the cooling liquid outlet is disposed on the liquid cooling base plate and/or the cover plate.

3. The electrical connector assembly according to claim 1, further comprising an inlet joint which is fixed on the liquid cooling plate and communicates with the cooling liquid inlet, and an outlet joint which is fixed on the liquid cooling plate and communicates with the cooling liquid outlet.

4. The electrical connector assembly according to claim 3, wherein the inlet joint and the outlet joint are located adjacent to each other.

5. The electrical connector assembly according to claim 1, wherein flow directions of a cooling liquid in the first flow channel and the second flow channel are opposite.

6. The electrical connector assembly according to claim 1, wherein the first inlet flow channel comprises a third flow channel cavity formed on the liquid cooling base plate; the third flow channel cavity is communicated in series with the second flow channel cavity; the third flow channel cavity comprises a fifth flow channel and a sixth flow channel which is arranged side by side with the fifth flow channel; the fifth flow channel communicates with the sixth flow channel; and flow directions of the cooling liquid in the fifth flow channel and the sixth flow channel are the same.

7. The electrical connector assembly according to claim 6, wherein a plurality of second flow channel cavities are provided and arranged in series; the first flow channel cavity is communicated in series upstream of the second flow channel cavities; the third flow channel cavity is communicated in series downstream of the second flow channel cavities.

8. The electrical connector assembly according to claim 6, wherein the first inlet flow channel further comprises a converging channel formed on the liquid cooling base plate; the converging channel comprises a first converging flow channel and a second converging flow channel; the first converging flow channel is communicated in series downstream of the third flow channel cavity; and the second converging flow channel is communicated in series downstream of the first converging flow channel.

9. The electrical connector assembly according to claim 8, wherein the second inlet flow channel comprises a flow guide channel formed on the liquid cooling base plate and a fourth flow channel cavity formed on the liquid cooling base plate; the flow guide channel is communicated in series upstream of the fourth flow channel cavity; the fourth flow channel cavity at least comprises a seventh flow channel and an eighth flow channel arranged side by side with the seventh flow channel; flow directions of the cooling liquid in the seventh flow channel and the eighth flow channel are opposite.

10. The electrical connector assembly according to claim 9, wherein the liquid cooling base plate defines a collection cavity; the collection cavity communicates with an outlet of the second flow channel and an outlet of the fourth flow channel cavity; and the outlet flow channel communicates with the collection cavity.

11. The electrical connector assembly according to claim 9, wherein the outlet flow channel, the flow guide channel and the first converging flow channel are arranged parallel to one another and disposed at intervals in sequence along a direction opposite to the mating direction.

12. The electrical connector assembly according to claim 1, wherein the electrical connector comprises a light guide pipe installed on the metal shielding cage; the light guide pipe comprises a head, an extending portion extending from the head, and a bent portion bent from the extending portion; the head is erected on the metal shielding cage; the extending portion is bent toward the metal shielding cage to be attached to the metal shielding cage; and the head is located higher than the extending portion.

13. The electrical connector assembly according to claim 1, wherein a plurality of electrical connectors are provided and arranged at intervals along a width direction perpendicular to the mating direction.

14. An electrical connector assembly, comprising:

an electrical connector comprising an insulating body, a plurality of conductive terminals and a metal shielding cage covering the insulating body; the insulating body comprising a mating surface and a mating slot extending through the mating surface; each conductive terminal comprising a contact portion extending into the mating slot; the metal shielding cage comprising a receiving cavity communicating with the mating slot; the receiving cavity and the mating slot being configured to jointly receive a mating plug along a mating direction; and a liquid cooling plate at least partially covering the metal shielding cage, the liquid cooling plate comprising a cooling liquid inlet and a cooling liquid outlet; the liquid cooling plate comprising a liquid cooling base plate and a cover plate fixed to the liquid cooling base plate; the liquid cooling base plate comprising a first inlet flow channel, a second inlet flow channel and an outlet flow channel; the first inlet flow channel and the second inlet flow channel being fluidly arranged in parallel, and communicate with the cooling liquid inlet; the first inlet flow channel and the second inlet flow channel converging into the outlet flow channel which communicates with the cooling liquid outlet;

wherein the liquid cooling base plate comprises a first surface and a recessed portion recessed from the first surface; the first inlet flow channel, the second inlet flow channel and the outlet flow channel are located in the recessed portion; and wherein the cover plate is installed in the recessed portion; and the cover plate comprises a second surface which is flush with the first surface.

15. The electrical connector assembly according to claim 14, wherein the liquid cooling base plate defines a first hole exposed in the recessed portion; the cover plate defines a second hole extending through the second surface; and the electrical connector assembly comprises a fastener mounted into the second hole and the first hole.

16. The electrical connector assembly according to claim 14, wherein the liquid cooling base plate comprises a third surface opposite to the first surface; the third surface is attached to a top wall of the metal shielding cage.

17. An electrical connector assembly, comprising:

a plurality of electrical connectors disposed at intervals along a width direction, each electrical connector comprising an insulating body, a plurality of conductive terminals and a metal shielding cage enclosing the insulating body; the insulating body comprising a mating surface and a mating slot extending through the mating surface; each conductive terminal comprising an elastic contact portion extending into the mating slot; the metal shielding cage comprising a receiving cavity communicating with the mating slot; the receiving cavity and the mating slot being configured to jointly receive a mating plug along a mating direction; and a metal liquid cooling plate being attached to top walls of the metal shielding cages of the plurality of electrical connectors; the liquid cooling plate comprising a cooling liquid inlet and a cooling liquid outlet; the liquid cooling plate comprising a liquid cooling base plate and a cover plate fixed to the liquid cooling base plate; the liquid cooling base plate comprising a first inlet flow channel, a second inlet flow channel and an outlet flow channel; the first inlet flow channel and the second inlet flow channel being fluidly arranged in parallel, and communicate with the cooling liquid inlet; the first inlet flow channel and the second inlet flow channel converging into the outlet flow channel which communicates with the cooling liquid outlet;

wherein each electrical connector comprises a light guide pipe installed on the metal shielding cage; the light guide pipe comprises a head and an extending portion extending from the head; and wherein the liquid cooling base plate further comprises a plurality of bottom grooves and a plurality of middle portions; each middle portion is located between two adjacent bottom grooves along the width direction; the bottom grooves are configured to receive the extending portions of the light guide pipes; and the middle portions are attached to the top walls of the metal shielding cages.

18. The electrical connector assembly according to claim 17, wherein the light guide pipe comprises a bent portion bent from the extending portion; the head is erected on the metal shielding cage; the extending portion is bent toward the metal shielding cage to be attached to the metal shielding cage; and the head is located higher than the extending portion.

* * * * *